United States Patent
Blais-Morin

(10) Patent No.: US 10,015,394 B2
(45) Date of Patent: Jul. 3, 2018

(54) CAMERA-BASED SPEED ESTIMATION AND SYSTEM CALIBRATION THEREFOR

(71) Applicant: Genetec Inc., St-Laurent (CA)

(72) Inventor: Louis-Antoine Blais-Morin, Montreal (CA)

(73) Assignee: GENETEC INC., St. Laurent, QC (CA)

( * ) Notice: Subject to any disclaimer, the term of this patent is extended or adjusted under 35 U.S.C. 154(b) by 333 days.

(21) Appl. No.: 14/876,016

(22) Filed: Oct. 6, 2015

(65) Prior Publication Data

US 2017/0098304 A1     Apr. 6, 2017

(51) Int. Cl.
| | |
|---|---|
| *H04N 5/232* | (2006.01) |
| *G06T 7/80* | (2017.01) |
| *G06T 7/246* | (2017.01) |
| *F16M 11/06* | (2006.01) |

(Continued)

(52) U.S. Cl.
CPC ......... *H04N 5/23229* (2013.01); *F16M 11/06* (2013.01); *F16M 11/28* (2013.01); *G06T 7/246* (2017.01); *G06T 7/80* (2017.01); *H04N 5/232* (2013.01); *G06T 2207/10016* (2013.01); *G06T 2207/30236* (2013.01); *G08G 1/052* (2013.01)

(58) Field of Classification Search
CPC .................................................. H04N 5/23229
See application file for complete search history.

(56) References Cited

U.S. PATENT DOCUMENTS

| | | | |
|---|---|---|---|
| 3,788,201 A * | 1/1974 | Abell | .................... G08G 1/054 250/473.1 |
| 4,847,772 A | 7/1989 | Michalopoulos et al. | |
| 5,509,082 A | 4/1996 | Toyama et al. | |

(Continued)

FOREIGN PATENT DOCUMENTS

| | | |
|---|---|---|
| CN | 102074113 A | 5/2011 |
| JP | 2946620 B2 | 7/1999 |

(Continued)

OTHER PUBLICATIONS

Giovanni Garibotto et al., Speed-Vision: Speed Measurement by License Plate Reading and Tracking, Proceedings of ITSC01, IEEE Intelligent Transportation Systems, Aug. 25-29, 2001, Oakland (CA), pp. 585-590.

(Continued)

*Primary Examiner* — James Pontius
(74) *Attorney, Agent, or Firm* — Anglehart et al.

(57) ABSTRACT

Provided is a visual vehicle speed estimation system based on camera output and calibration for such a vehicle speed estimation system. The calibration allows use of the system where the absolute camera position is unknown. Calibration determines an absolute-position-independent relationship between an image space placement and a physical space position relative to the camera. The calibration is done on the basis of camera output using vehicle features of known dimensions and some assumed physical constraints related thereto to provide a conversion relationship between image coordinates and physical space coordinates in a physical space defined in relation to the camera. This relationship is then used to estimate vehicle speeds based only on the visual information provided by the camera. Abstract is not to be interpreted as limiting.

20 Claims, 9 Drawing Sheets

(51) Int. Cl.
*F16M 11/28* (2006.01)
*G08G 1/052* (2006.01)

(56) References Cited

U.S. PATENT DOCUMENTS

| | | | |
|---|---|---|---|
| 5,734,337 | A | 3/1998 | Kupersmit |
| 6,628,804 | B1 | 9/2003 | Edanami |
| 6,690,294 | B1 | 2/2004 | Zierden |
| 7,262,790 | B2 | 8/2007 | Bakewell |
| 7,586,400 | B2 * | 9/2009 | Nagaoka ............... B60W 50/14 340/425.5 |
| 7,920,959 | B1 | 4/2011 | Williams |
| 8,135,177 | B2 | 3/2012 | Benten |
| 8,184,863 | B2 | 5/2012 | Wang |
| 8,238,610 | B2 | 8/2012 | Shah et al. |
| 8,284,996 | B2 | 10/2012 | Winkler |
| 8,401,240 | B2 | 3/2013 | Dixon et al. |
| 8,599,368 | B1 | 12/2013 | Cilia et al. |
| 8,964,031 | B2 * | 2/2015 | Clucas ............... G06T 7/2033 348/143 |
| 2005/0226508 | A1 * | 10/2005 | Gotohda ............ G06K 9/00362 382/190 |
| 2010/0158321 | A1 | 6/2010 | Shah et al. |
| 2012/0206602 | A1 * | 8/2012 | Clucas ............... G06T 7/2033 348/149 |
| 2013/0229517 | A1 | 9/2013 | Kozitsky et al. |
| 2013/0294643 | A1 | 11/2013 | Fan et al. |
| 2014/0063247 | A1 | 3/2014 | Bernal et al. |

FOREIGN PATENT DOCUMENTS

| | | |
|---|---|---|
| JP | 2001-126184 A | 5/2001 |
| JP | 2002-074368 A | 3/2002 |

OTHER PUBLICATIONS

Garg et al., Real-Time License Plate Recognition and Speed Estimation from Video Sequences, ITSI-TEEE, vol. 1 issue 5 2013, 2320-8945
Luvizon , Vehicle Speed Estimation by License Plate Detection and Tracking, Federal Univ. of Technology Parana Aug. 2015 1-73.
Luvizon et al., Vehicle Speed Estimation by License Plate Detection and Tracking, 2014 IEEE, 6563-6567.
PCT/CA2016/050962 IPRP.
PCT/CA2016/050962 ISR.
PCT/CA2016/050962 written opinion.

* cited by examiner

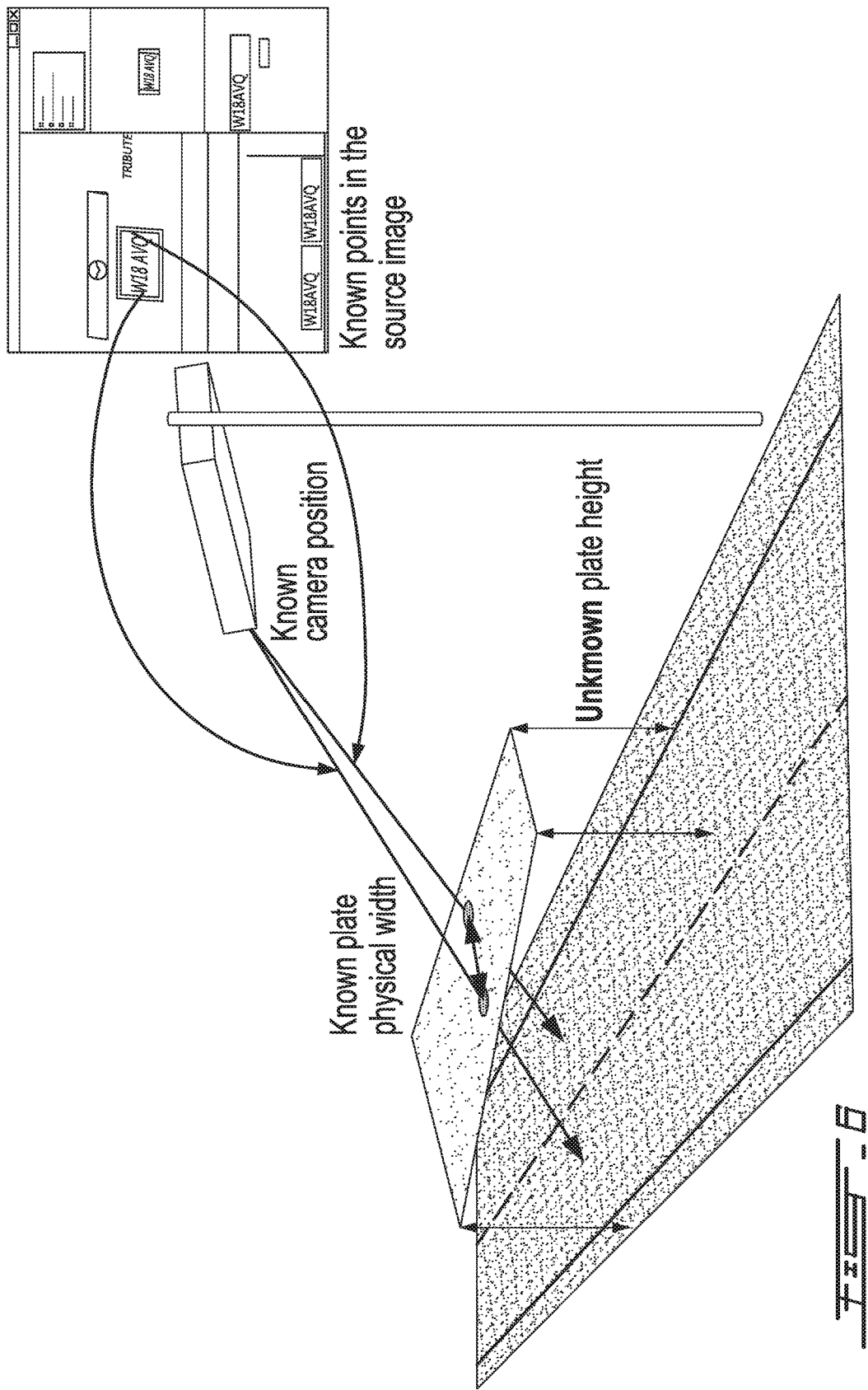

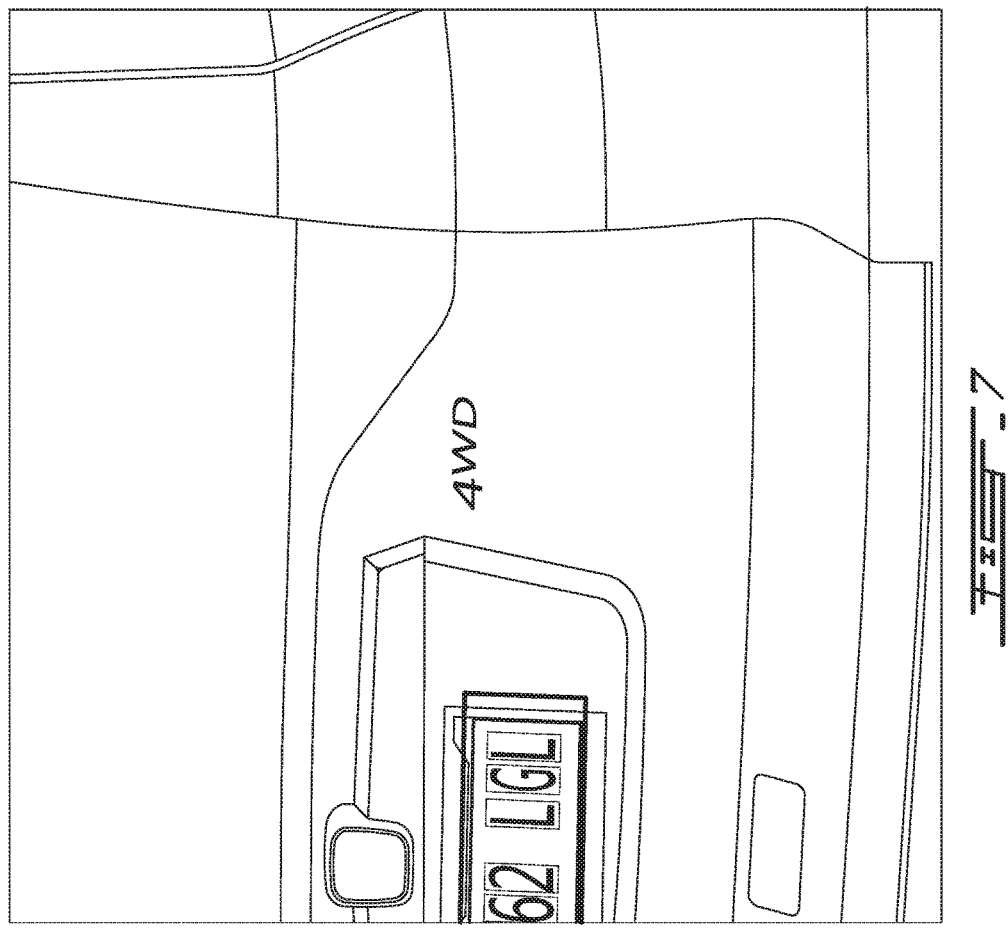

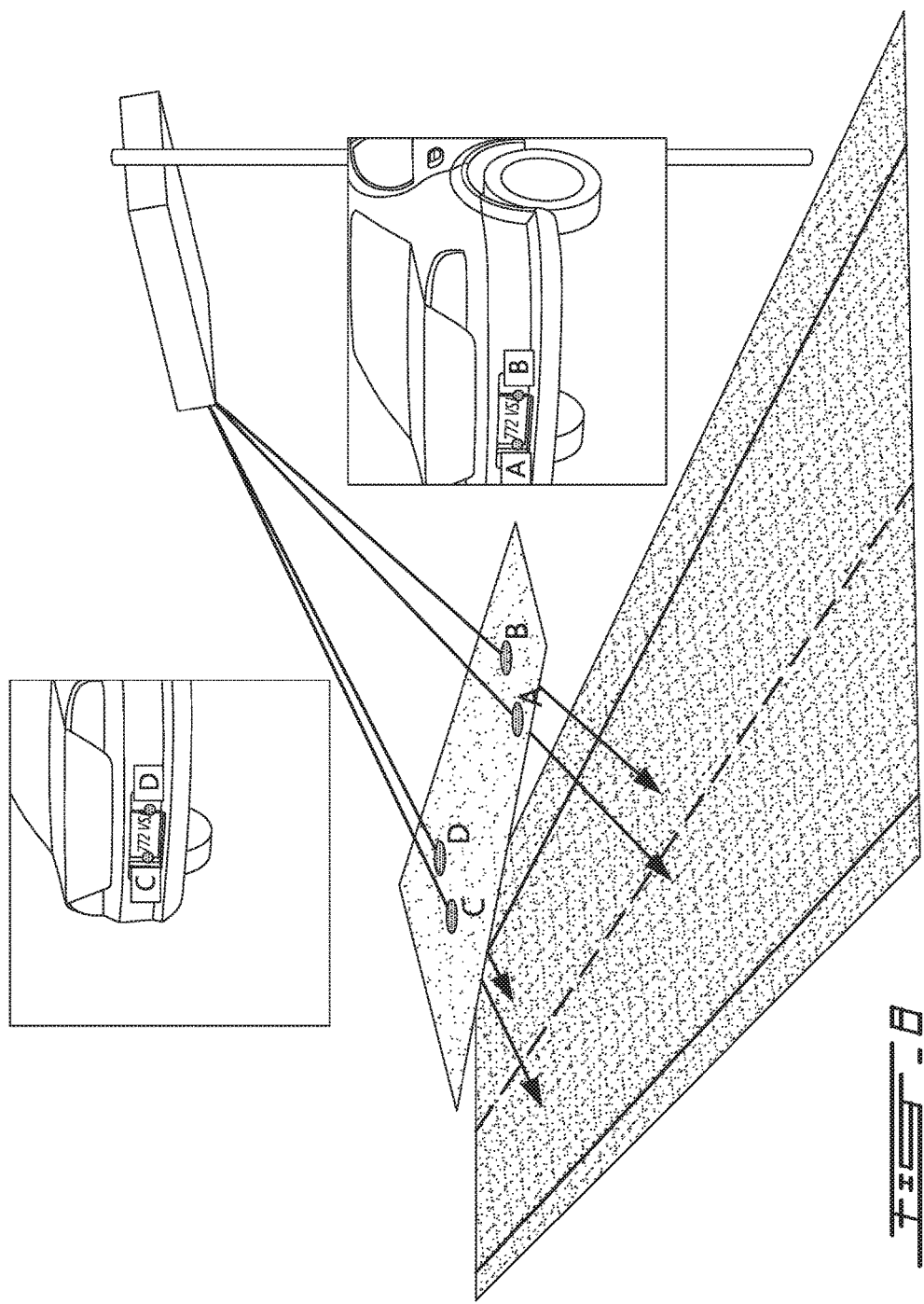

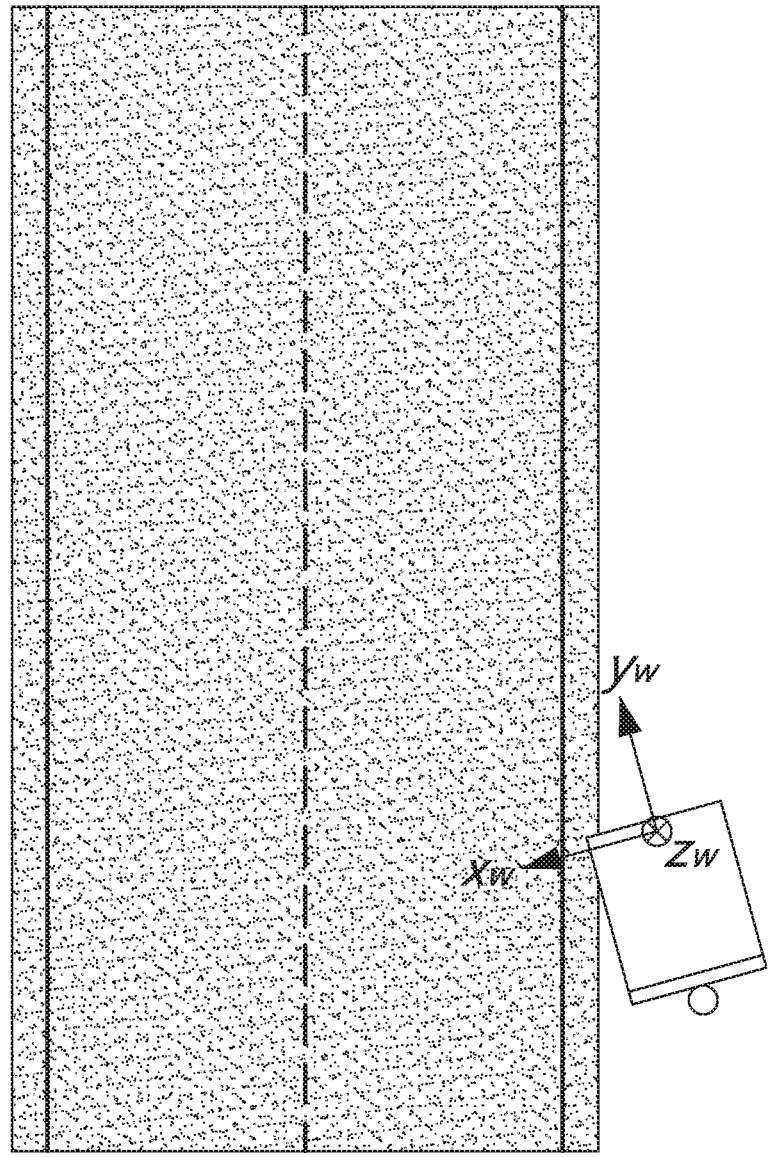

CAMERA-BASED SPEED ESTIMATION AND SYSTEM CALIBRATION THEREFOR

TECHNICAL FIELD

This invention concerns the field of vehicle speed estimation based on visual information and the field of calibration of systems for visual vehicle speed estimation.

BACKGROUND

Provided is improved technology for vehicle speed estimation. Vehicle speeds are estimated using visual information derived from a camera, for example in an LPR system. Calibration is provided to allow the system to estimate vehicle speeds in a variety of setups including setups where the images are provided from cameras that are located off-center from a traffic lane, for example on the side of the road. Calibration may be done with as little as a single passage of an unknown vehicle. In some embodiments it may be done alongside speed estimation with every vehicle detected/estimated.

In accordance with a non-limiting example is provided a method for calibrating a vehicle speed estimation system that employs a camera having a set of camera parameters to estimate the speed of vehicles based on images received from the camera, the images defined in an image space and the vehicles and camera each belonging to a physical space and having an absolute position therein. The method comprises receiving at a controller from the camera a calibration image stream comprising a first image of a vehicle captured at a first time and a second image of the vehicle captured at a second time, the first and second images having the same image space. The method further comprises at a controller executing controller logic to identify in each of the first and second image a vehicle feature having a known dimension in the physical space, the identifying comprising determining a placement of the vehicle feature in the image space at each of the first and second times. The method further comprises at the controller executing controller logic to define on the basis of the placement of the vehicle feature in the image space at each of the first and second times an absolute-position-independent relationship between an image space placement and a physical space position relative to the camera. The method further comprises at the controller, using controller logic, applying the absolute-position-independent relationship between an image space placement and a physical space position relative to the camera in a speed estimation algorithm to determine the speed of a vehicle captured by the camera.

In accordance with another non-limiting example is provided a camera-based visual speed estimation system for estimating the speed of vehicles on the basis of video output from of a camera. The camera-based visual speed estimation system comprises a controller camera input for receiving from the video output of the camera comprising at least first and second images of a travelling vehicle captured at respective first and second times, the first and second images being defined in an image space and the travelling vehicle and camera each belonging to a physical space and having respective absolute positions therein. The camera-based visual speed estimation system further comprises a tangible controller in communication with the camera input and receiving therefrom the video data from the camera comprising at least the first and second images. The controller comprises calibration logic executable on the controller for causing the controller to identify in each of the first and second image a vehicle feature having a known dimension in the physical space, the identifying comprising determining a placement of the vehicle feature in the image space at each of the first and second times. The controller further comprises calibration logic executable on the controller for causing the controller to define on the basis of the placement of the vehicle feature in the image space at each of the first and second times an absolute-position-independent relationship between an image space placement and a physical space position relative to the camera. The controller further comprises calibration logic executable on the controller for causing the controller to apply the absolute-position-independent relationship between an image space placement and a physical space position relative to the camera in a speed estimation algorithm to derive speed estimation data indicative of the speed of a vehicle captured by the camera. The camera-based visual speed estimation system further comprises a controller output in communication with the controller for receiving from the controller the speed estimation data and outputting the speed estimation.

SUMMARY

Applicant has made a number of improvements that taken alone or in combination can provide advantages over the state-of-the-art approaches.

In accordance with a first exemplary embodiment is provided a method for calibrating a vehicle speed estimation system that employs a camera having a set of camera parameters to estimate the speed of vehicles based on images received from the camera, the images defined in an image space and the vehicles and camera each belonging to a physical space and having an absolute position therein. The method comprises receiving at a controller from the camera a calibration image stream comprising a first image of a vehicle captured at a first time and a second image of the vehicle captured at a second time, the first and second images having the same image space. The method further comprises at a controller executing controller logic to identify in each of the first and second image a vehicle feature having a known dimension in the physical space, the identifying comprising determining a placement of the vehicle feature in the image space at each of the first and second times. The method further comprises at the controller executing controller logic to define on the basis of the placement of the vehicle feature in the image space at each of the first and second times an absolute-position-independent relationship between an image space placement and a physical space position relative to the camera. The method further comprises at the controller, using controller logic, applying the absolute-position-independent relationship between an image space placement and a physical space position relative to the camera in a speed estimation algorithm to determine the speed of a vehicle captured by the camera.

In accordance with a first exemplary embodiment is provided a camera-based visual speed estimation system for estimating the speed of vehicles on the basis of video output from of a camera, the camera-based visual speed estimation system comprising a controller camera input for receiving from the video output of the camera comprising at least first and second images of a travelling vehicle captured at respective first and second times, the first and second images being defined in an image space and the travelling vehicle and camera each belonging to a physical space and having respective absolute positions therein. The system further comprises a tangible controller in communication with the camera input and receiving therefrom the video data from the camera comprising at least the first and second images, the controller comprising calibration logic executable on the controller for causing the controller to a) identify in each of the first and second image a vehicle feature having a known dimension in the physical space, the identifying comprising determining a placement of the vehicle feature in the image space at each of the first and second times; b) define on the basis of the placement of the vehicle feature in the image space at each of the first and second times an absolute-position-independent relationship between an image space placement and a physical space position relative to the camera; and c) apply the absolute-position-independent relationship between an image space placement and a physical space position relative to the camera in a speed estimation algorithm to derive speed estimation data indicative of the speed of a vehicle captured by the camera. The system further comprises a controller output in communication with the controller for receiving from the controller the speed estimation data and outputting the speed estimation data.

BRIEF DESCRIPTION OF THE DRAWINGS

The invention will be better understood by way of the following detailed description of embodiments of the invention with reference to the appended drawings, in which:

FIG. 6 shows an exemplary plate image captured by the camera of FIG. 1 with a license plate that is only partially contained within the image;

FIG. 7 shows exemplary images captured by the camera of the vehicle speed estimation system of FIG. 1 at two different times overlaid over a perspective view of the camera of the vehicle speed estimation system of FIG. 1 illustrating the physical position at which these images were captured; and FIG. 8 shows a top plan view of the camera of the vehicle speed estimation system of FIG. 1 with the physical-space coordinate system origin of FIG. 4.

FIG. 9 shows a top view of the camera of the vehicle speed estimation system of FIG. 1 with a physical-space coordinate system origin according to a non-limiting example.

DETAILED DESCRIPTION

Figure 1:
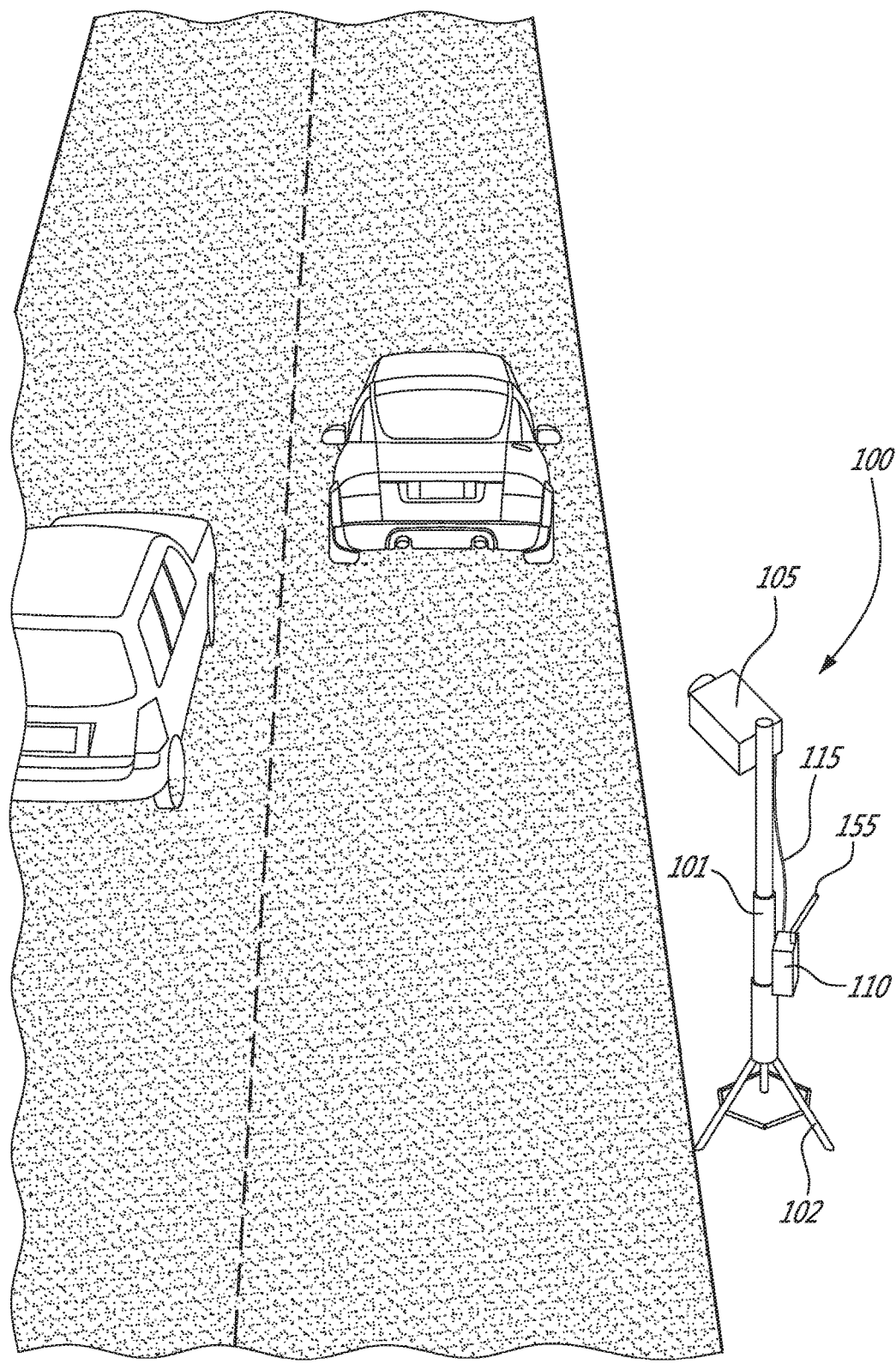
FIG. 1 shows a front perspective view of a vehicle speed estimation system in accordance with a non-limiting example.
Figure 2:
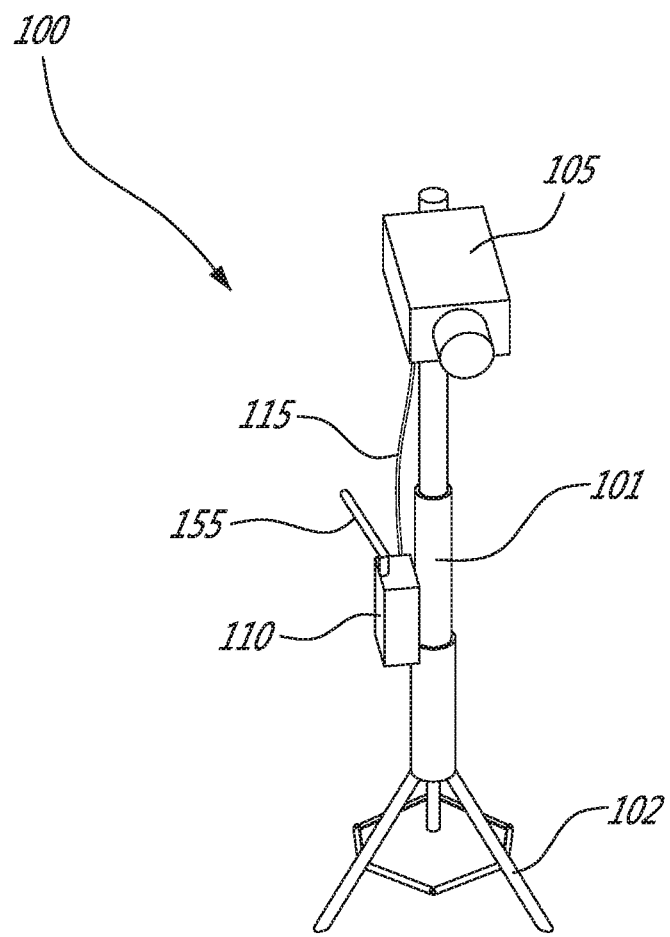
FIG. 2 shows a rear perspective view of the vehicle speed estimation system of FIG. 1.

FIG. 1 shows a vehicle speed estimation system 100 in accordance with an exemplary embodiment. The vehicle speed estimation system 100 comprises a source of image data providing images of moving vehicles. In this case the source of image data is a camera 105. The camera 105 is in communication with a controller 110 that receives image data from the camera and performs vehicle speed estimation on the basis of the image data. FIG. 2 shows the vehicle speed estimation system 100 from the front.

The camera 105 is a fixed camera used in an LPR system. In particular, in this example the camera is a SharpX™ camera from Genetec™, which captures both color and infrared high-resolution images. In this example, speed estimation and calibration will use license plate recognition technology which is better performed using the infrared images thus only the infrared images will be used for this. The SharpX™ camera provides 1024×946 progressive scan frames at 30 frames per second and has a pulsed LED infrared illuminator allowing it to be used in complete obscurity. When used in the AutoVu™ system, license plate recognition of reflective plates can occur with plate up to 100 feet (30 meters) away.

As shown the camera 105 is in data communication with the controller 110 via data communication link 115. The data communication link 115 here is provided using a cable connection; however other technologies for transferring image data may be used.

In the illustrated example, the camera 105 and controller 110 are mounted on a pole 101 stemming from a base 102. Advantageously in this example the pole 101 is a telescopic pole and the base 102 is a foldable base allowing the system 101 to be quickly and easily moved from one location to another. Although shown here at mid level on the pole, 101, the controller 110 may be mounted high up to prevent tampering. The camera 105 is mounted to an adjustable articulation (not shown) allowing the adjustment of the camera 105's angles with respect to the road so as to allow someone installing the vehicle speed estimation system 100 to frame a portion of the road where vehicles are to be monitored. Also not shown, the vehicle speed estimation system 100 comprises a power source providing power to the controller 110 and, if necessary, the camera 105. This may include a computer power supply-type plug-in device, and/or a battery and/or a solar array.

The installation shown here is merely one of many possibilities. The SharpX™ and AutoVu™ system is already available for installation on patrol vehicles. In an alternate embodiment, the controller 110 may be in a vehicle and the camera 105 may be mounted on a sufficiently elevated roof rack. Advantageously the quick calibration system provided here allows easy recalibration every time the vehicle, and thus the camera, is moved to a new location. Other possible installation includes examples where the camera 105 a security camera mounted, e.g., on a building and the controller 105 is implemented on a computer in the building.

The controller 110 of this example comprises a AutoVu™ ALPR processing unit having an Intel™ Atom™ N2600 processor and at least one ALPR camera input for receiving image data from the camera 105.

Although the present embodiment employs the SharpX™ camera and a modified AutoVu™ ALPR Processing Unit, the scope of the present contribution is not intended to be limited to a single platform or set of equipment. Other types of hardware may be used for camera 105, and indeed that source of image data may even be non-camera devices such as broadcast-receiving equipment receiving image data from elsewhere and providing it to the controller 110.

Figure 3:
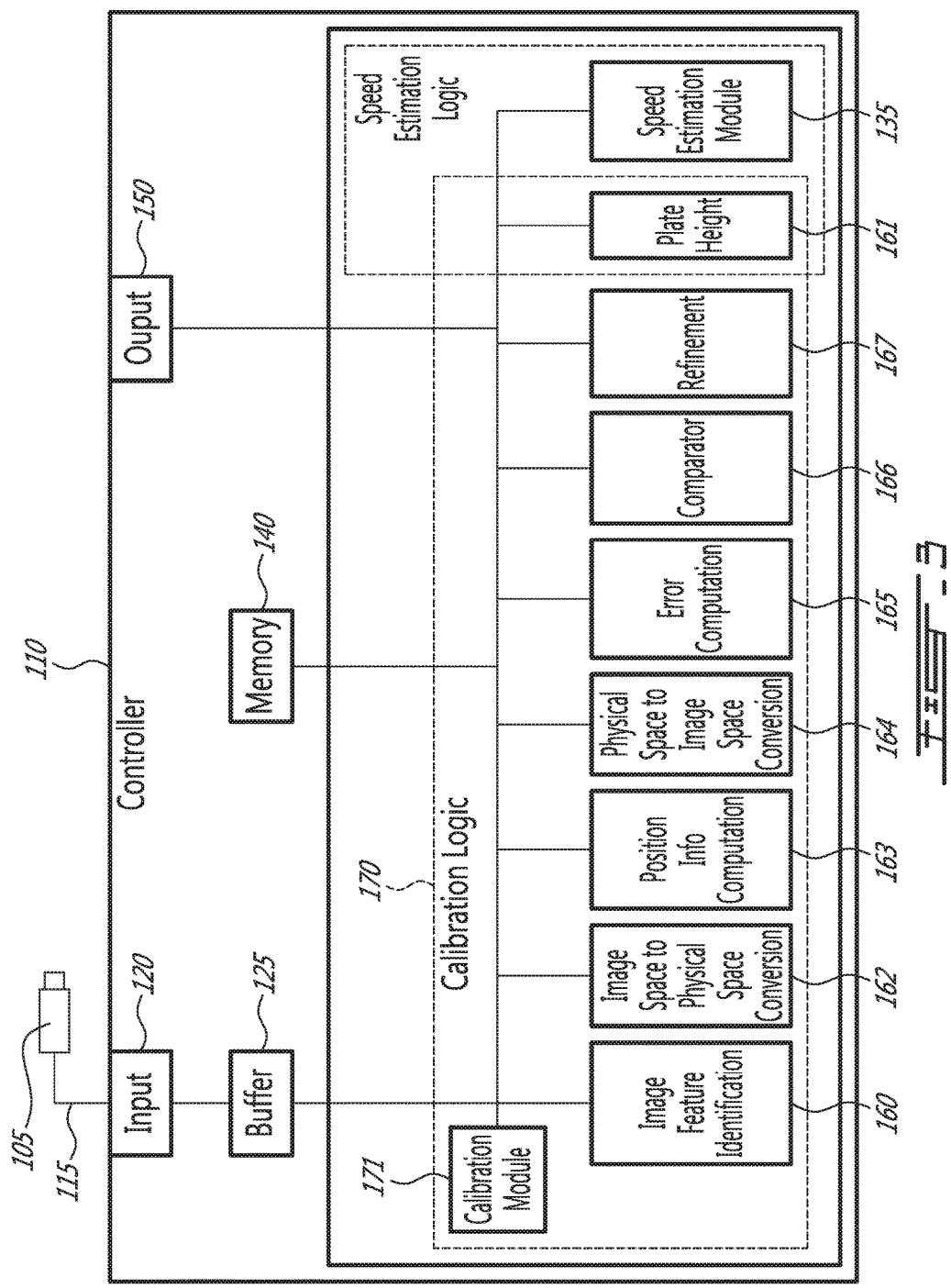
FIG. 3 shows a block diagram of a controller for the vehicle speed estimation system of FIG. 1 according to a non-limiting example.

FIG. 3 shows a non-limiting example of the vehicle speed estimation system 100 and includes a block diagram of the controller 110. As shown, the image data provided by the camera 105 is received at the controller 115 at an input 120. The input 120 comprises the logic required to recover images from the image data received from the source of image data. In this particular example, camera 105 provides image data in raw format, however in some embodiments, the camera 105 may comprise an MPEG encoder for encoding the images and transmits the images in encoded form as an MPEG stream. At the controller 110, input 120 may comprise an MPEG decoder, which is well-known and defined in the various MPEG standards, where the digital stream is decoded to recover images from the image data. Naturally other types of decoding and pre-processing logic may be included at the input 120.

In alternate embodiments, the image data may be provided to the controller 110 in other forms, and the input 120 may be adapted accordingly. For example, in one conceivable alternative, the image data may be provided in analog form and the input 120 may comprise one or more suitable analog-to-digital converter to recover digital forms of the images comprised in the image data.

In this example, an image buffer 125 is provided to buffer incoming images. Although shown here on its own, the image buffer 125 may be provided as part of the input 120. The image buffer receives pixels and/or whole images as they are recovered by the input 120 and stores them temporarily to release them to the processing logic 130 at the rate at which the processing unit 130 can receive them. Thus the input 120 is in communication with the controller 110 and may be in direct or indirect communication therewith.

The controller 110 comprises a processing logic 130 comprising logic for processing the images received in the image data. The processing logic 130 of the controller 110 comprises logic modules for performing various tasks as described herein. In the present embodiment, the processing is performed by a general-purpose processing unit under instructions from program code stored tangibly in a memory and comprising instructions for the instructing the general-purpose processing unit to perform the described function. Sufficient detail is provided herein to allow a skilled programmer to implement the processing logic without recourse to inventiveness. Other embodiments are possible. In particular, the logic provided herein may also be implemented as hardware, e.g. in an FPGA or ASIC implementation. Here too a skilled hardware programmer is provided sufficient details to implement the taught system in hardware without recourse to inventive impulse.

The controller 110 may include an external memory 140, such as a DDR3 memory module serving as random access memory to the processing unit. As will be understood, program code of the processing logic may be stored in the memory for loading into the processing unit's program registers to execute the programming logic. However, the programming logic may also comprise instructions to store and seek data in memory 140. In order to illustrate possible access to the memory 140 by the processing logic 130, the memory 140 and processing logic 130 are shown as separate entities. This is merely for clarity of the description. The skilled person will appreciate that the memory 140 may be implemented in multiple units and/or with multiple layers and details of known memory management and implementation techniques will be omitted herein.

The processing logic 130 is controller logic and comprises logic for performing various tasks. These are shown here as separate modules. Each module comprises logic, in this case program code instructions to implement the functionality described herein, which logic may be organized in any suitable manner, for example in certain programming languages a programmer may implement modules in respective classes, however the modules may be implemented in other ways as determined by a non-inventive skilled programmer.

The processing logic 130 is therefore executable at the controller for causing the controller to perform various tasks as described herein.

As shown, the processing logic 130 includes speed estimation logic, shown here as speed estimation logic 136. The speed estimation module implements a vehicle speed estimation algorithm which estimates the speed of moving vehicles depicted in received images. In the present embodiment, the speed estimation algorithm requires knowledge of camera parameters which include the focal length (F), tilt angle ($\theta_t$) and roll angle ($\theta_r$) of the camera 105 which captured the images at the time at which the images where captured. The present algorithm also assumes that the camera position is fixed with respect to the road. The speed estimation module 135 computes vehicle speeds on the basis of detected movement of a feature of a vehicle that is shown moving in two or more images at different times. The speed estimation module therefore requires at least two images of the vehicle in motion, or more particularly of the feature used in speed estimation.

In the present embodiment, the feature used for speed estimation is the license plate of the vehicle. Advantageously, road vehicles typically all have a license plate, the display of which is legally mandated making this feature particularly useful. Moreover license plate dimensions are typically known, and in many jurisdictions are constant. For example in most of North America, the width of a license plate of local vehicles is known to be 300 mm. Moreover, license plate data may include sufficient information to identify the type of license plate (e.g. a country/jurisdiction code and a license plate number, which may in turn be used to ascertain the dimensions of the license plate, e.g. by looking it up in a table of license plate dimensions). The license plate, as a vehicle feature, has another advantage: it has dimensions that are reliably perpendicular to the motion of the vehicle. In this context a dimension is considered to "be" perpendicular to the motion of the vehicle if it is measured in a plane or vector that is perpendicular to the motion of the vehicle. For example, the width of the license plate is measured along a vector going side-to-side widthwise to the license plate, e.g. a vector defining a top edge or a vector defining a bottom edge of the license plate and that vector is substantially perpendicular to the direction of motion of the vehicle. As such, the width is considered herein to be a dimension that is perpendicular to the motion of the vehicle even though the value of the width, e.g. in centimeters, may itself be a scalar.

Note that while license plates may be installed with a forward or downward incline, the side-to-side width of the plate will typically be perpendicular to the motion of the vehicle at any given moment. Yet another advantage of the license plate as a feature is that it is generally unmoving in the vertical direction with respect to the road. That is to say, the license plate of a moving vehicle is typically at a constant height with respect to the road as the vehicle moves. As we will see later, these benefits allow the implementation of novel techniques, particularly for calibrating the system and deriving camera parameters.

For the purposes of describing the processing logic 130, the vehicle feature used for speed estimation and system calibration will be a license plate. However, other vehicle features, particularly other vehicle features satisfying the above advantages, may be used in variants of the algorithm. For example where the road-contacting portion of the rear tires can be seen from a satisfactory angle, and if these are of known distance from one another, the road-contacting portion of the rear tire may be used as the vehicle feature with at least the spread between them as known dimension.

The processing logic 130 provides speed estimation data to an output 150 which outputs the data in a suitable way from the controller. The skilled person will appreciate that there are many ways in which speed estimation data may be used, and accordingly, the exact manner and method of output may be adapted to a particular use. In the example shown in FIG. 1 and FIG. 2, the vehicle speed estimation system 100 comprises a wireless communication antenna 155 for communicating speed estimation data wirelessly to a remote station. While the reader will appreciate that this may be done in many ways, in this particular example the antenna 155 is a wireless phone antenna driven by a modem for transmitting over a wireless phone data network, such as an LTE network, and the speed estimation data is provided alongside license plate recognition data (e.g. the license plate number) and image data (e.g. images of the vehicle showing the license plate) to a remote device over an internet connection.

In other embodiments, the output 150 may be an output to a display and may provide speed estimation data alongside other data visually as a monitor output, e.g. over an HDMI connection. The controller 110 may implement a graphical user interface on the monitor in which estimated vehicle speeds may be displayed numerically, e.g. alongside license plate recognition data (e.g. the license plate number) and image data (e.g. images of the vehicle). Output to a monitor does not preclude output to a remote device over a network connection, both of which can be available, e.g. simultaneously.

Thus the speed estimation data received from the processing logic 130 is output by the output 150, and may be output in altered form (e.g. in a display signal).

The controller 110 may also store speed estimation data, e.g. alongside license plate recognition data (e.g. the license plate number) and image data (e.g. images of the vehicle showing the license plate) for later transmission to an external device. In one alternate embodiment, the controller 110 stores this information, e.g. in memory 140, and comprises a USB connection at which a USB storage device may be docked and through which the information may be transferred.

When implementing a GUI, the controller 110 may also receive user input, e.g. via GUI manipulations. For example, the controller 110 may provide GUI queries as to whether to start or stop speed estimation (e.g. a start/stop button) and receive user indications in return to start or stop the speed estimation (e.g. a mouse click on that button) and in response the controller 110 may start or stop speed estimation operations. The controller 110 may provide GUI queries as to whether to calibrate the system (e.g. a calibrate or re-calibrate button) and receive user indications in return to calibrate the system (e.g. a mouse click on that button) and in response the controller 110 may calibrate the system. The query as to whether to calibrate the system may take the form of a query as to whether the camera 105 has been moved (e.g. a camera moved button), and the indication to calibrate the system may be an indication that the camera has been moved (e.g. a click on that button).

Advantageously, the vehicle speed estimation system 100 provides an automatic calibration that does not require any special input from an operator. Optionally, as described, there may be a "calibrate" command input merely to start the calibration, although even this is optional as the vehicle speed estimation system 100 may be configured, in some embodiments, to run the calibration procedure on every passing vehicle on which the used feature can be recognized, or to run the calibration procedure periodically. Alternatively the vehicle speed estimation system 100 may be provided with a system for detecting movement of the camera (e.g. visual detection of movement of the background of the images from camera 105, or accelerometers on the camera 105) and may be configured to run the calibration procedure upon detecting such movement.

The speed estimation logic 136 exploits a calibration upon the camera (e.g. done during production of each SharpX™ camera). This calibration allows transforming a position in an LPR image to a line in space that is at a known direction with respect to the camera. If the position of the camera is known with respect to the road, and the height of the license plate is known then it is possible to know the exact physical position of the license plate, and of individual identified characters thereon, with respect to the road.

Knowing the camera position with respect to the road and the plate height, however, poses certain challenges; however these are determined by the vehicle speed estimation system 100 in a manner which is explained herein. With these values found, the speed estimation module 135 calculates vehicle speeds. In particular, the speed estimation module takes corresponding positions in two images of the same plate (for example, the centers of the same character), maps these image positions to physical coordinate system, measures the physical displacement of the positions in the physical coordinate system and divides this displacement by the time span between these two images.

Here we being to see that there are two difference spaces in which a vehicle and a vehicle feature, e.g. the license plate, may be present. The images provided from the camera 105 are defined in an image space in which coordinates may be used to define the location of things in the image. Being two dimensional here, the location of things in an image is different from their location in the physical world. Here the image space can be defined by a two dimensional Euclidean coordinate system, specifically an x and y axis running respectively horizontally across and vertically across, e.g. from the top left corner of the image, incrementing by a single unit at every pixel. Thus every pixel has a unique coordinate such that objects in an image, such as a license plate or portions thereof, can be defined in the image space by their coordinates (in this example, their pixel location) in the image space.

Figure 4:
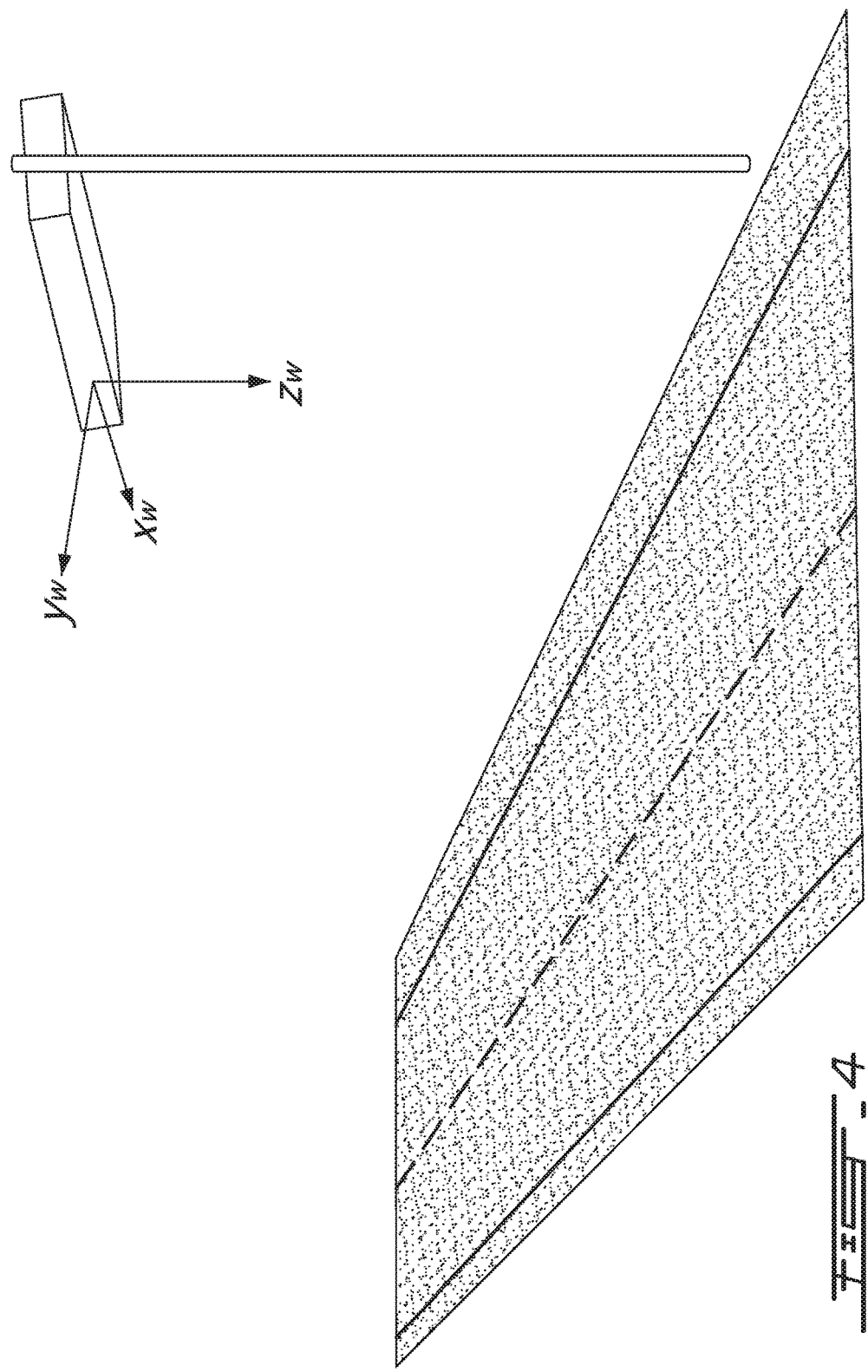
FIG. 4 shows a perspective view of the camera of the vehicle speed estimation system of FIG. 1 with a physical-space coordinate system origin according to a non-limiting example.

On the other hand objects being shown in the image data also in a physical space in which can be described the real tangible embodiment of the object. This physical space can be defined using, e.g. three dimensional Euclidean coordinates. If the physical location of an object is known at two different times, then the displacement of the object can be computed. If, in turn the time difference between the two different times is known, or can be computed, then the speed of the object can be computed by dividing the displacement by the time difference. Now if the object is travelling linearly, the so-computed speed, in the direction of the displacement, provides an accurate representation of the velocity of the object. FIG. 4 shows an example of physical space coordinate system which is described in more details herein.

It is important when determining the time difference between the first and the second images, when this time difference is used to estimate speed, to determine this time difference accurately, otherwise the estimated speed may be inaccurate. When the image data is provided by an analog connection, it may be possible to use synchronization with the Vsync signal to obtain time increments between images if the frame rate is known and reliable. However, in the present digital embodiment, counting frames may not be reliable since frames may be dropped or missed and encoding/decoding processing time may add unknown time variations. Moreover, using OS-provided time functions may not provide sufficient precision since OS thread scheduling may add too much uncertainty and the system time may be changed by external factors.

In this embodiment, a high accuracy timestamp is generated by the camera driver or firmware. This timestamp is used to calculate the time spans. The timestamps represent very accurately the time each frame was acquired and these are provided with the images and once captured are not affected changes in the OS's time. These timestamps are carried as image metadata and received at the input 120 and passed on to the processing logic 130. These timestamps, being generated in isolation are not necessarily "absolute" in that they may not necessarily be tied to a specific date and time. However, subtraction between timestamps is done and yields time spans between frames as required for speed estimation.

As mentioned above, the height of the license plate is determined in order to perform speed estimation. However, it is not necessary for an operator to measure and input an absolute position of any kind for the vehicle, license plate, or any other feature thereof. Rather, the processing logic 130 computes the vertical height between the license plate and the camera 105. This is sufficient since the license plate can safely be assumed not to vary in vertical distance from the road surface. The geometry is invariant to a vertical translation that is done together for the camera and the license plate.

Figure 5:
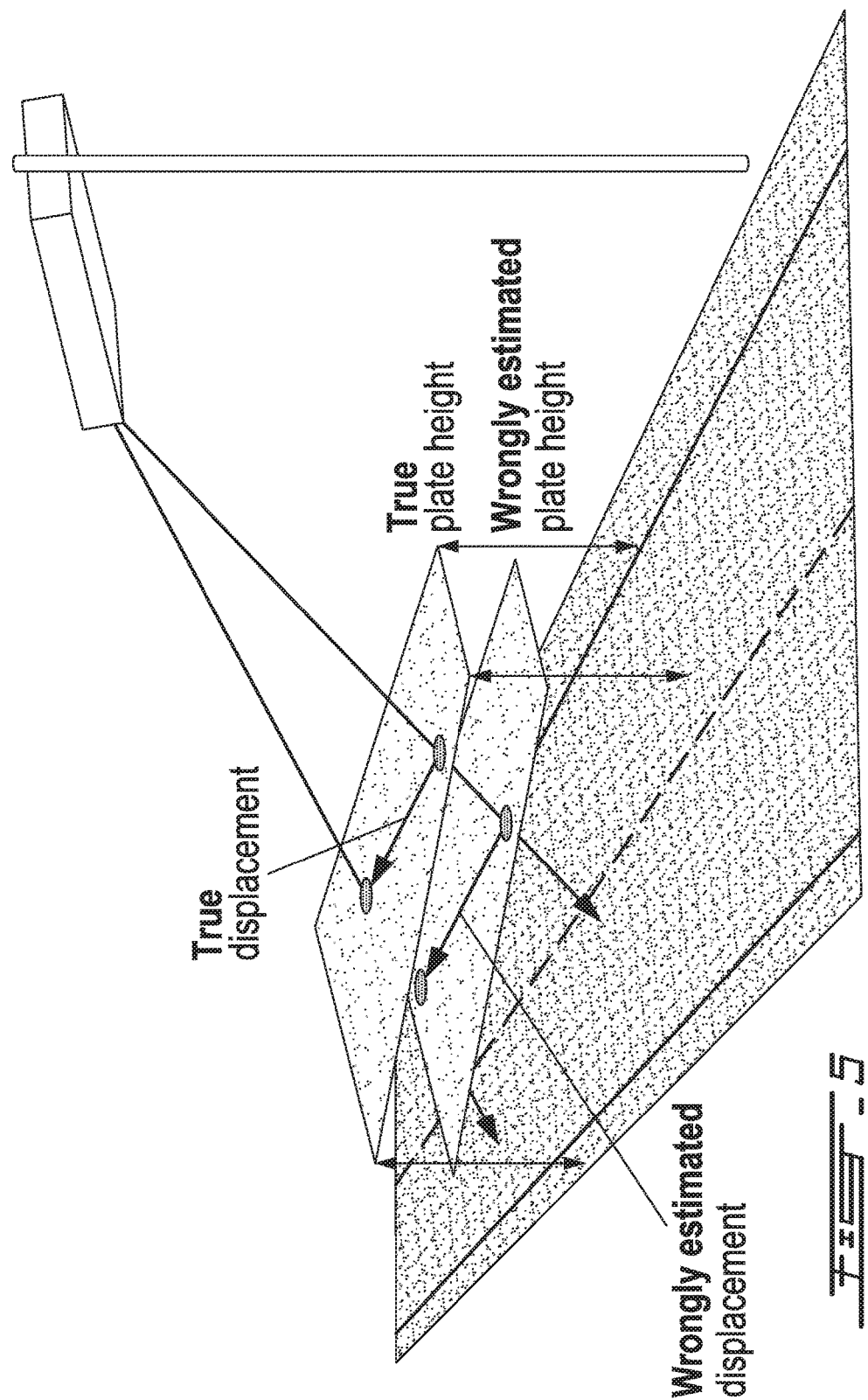
FIG. 5 illustrates the consequences of incorrect plate estimation on displacement computation on a perspective view of the camera of the vehicle speed estimation system of FIG. 1 according to a non-limiting example.

Incorrect height estimation can lead to incorrect speed estimation. In one example illustrated in FIG. 5, estimating incorrectly estimating a lower height for the license plate lead to the computation of a displacement that is longer than the actual displacement of the vehicle, leading to an overestimation of the speed of the vehicle.

The system employs knowledge of a known dimension to estimate the feature, in this case the license plate, height. One very reliable dimension for North American vehicles is the plate width. In virtually all jurisdictions of North America, the plate is fairly precisely 300 mm wide. Even in the presence of a frame around the plate, the width is only reduced by a few millimeters.

In order to compute feature height, the location of the feature in images is identified. To this end, the processing logic comprises image feature identification logic, here in the form of image feature identification module 160. The Image feature identification module receives two or more images from the image data each showing at least partially a same vehicle, and showing a particular feature, in this case the license plate, of the vehicle. The image feature identification module 160 comprises controller logic executable on the controller 110 to cause the controller to determine a placement of the vehicle feature in the image space at each of the first and second times. A placement may include various measures defining the location and/or dimensions of the vehicle feature, and in the present example the placement includes the image-space coordinates of at least a portion of the vehicle feature.

For each of the at least two images, the image feature identification module 160 performs a license plate recognition algorithm to extract the image-space location (specifically here, pixel coordinates) of the license plate, and in particular of the left side and right side of the license plate in each image. The image feature identification module 160 performs an extraction of a license plate region, a segmentation and recognition of the license plate features, in this case license plate characters (e.g. for logging purposes) and the left and right edges of the license plate to derive the image-space location (specifically here, pixel coordinates) of the license plate, and in particular of the left side and right side of the license plate in each image. For the left and right edges, various specific points may be selected to derive a discrete coordinate address, such as top or bottom corners. In the present example, points on the left and right edges are selected at the height of the bottom of each character (i.e. through an imaginary line at the bottom of the license plate characters) as ascertained by the LPR detection.

The feature identification module 160 accesses the image space location of the license plate in the images to obtain the portion of the images featuring the license plate. The plate height module 161 comprises a de-rotation and de-skewing algorithmic logic which it applies to the license plate image in order to generate a plate image that is a flat (horizontal) rectangle. The feature identification module 160 comprises algorithmic logic (in this case program code instructions) to calculate the sum of the image intensity (Y value) columns of the image and applies it to generate an image intensity profile. The feature identification module 160 further comprises algorithmic logic to compute the absolute derivative of the image intensity profile, and to identify the positions of the maximum absolute derivative and applies it to derive, based on the left side and right side positions of maximum absolute derivative the left side and the right side of the plate, which are where the intensity profile varies the most.

Processing logic 130 comprises plate height computing logic, here in the form of plate height module 161.

If the following are known:
position of the camera with respect to the road
position of the plate corners in the source image
physical width of the license plate (in this case, the width of 300 mm is used)
Then, it is possible to calculate the height of the license plate by solving the equation that imposes that the lines originating from the camera, in the direction of a point on the left side of the plate and in the direction on the right side of the plate, are distant of the physical width of the plate when they intersect the plane at the plate height.

The processing logic 130 assumes a set of physical constraints. In this example, the set of physical constraints comprises a known dimension of the vehicle feature, in this particular case the width, which is known to be 300 mm. In this example the set of physical constraints further comprises that the known dimension is perpendicular (that is to say that it is measured in a direction that is perpendicular) to the direction of travel of the vehicle. In this example the set of physical constraints further comprises that the vehicle feature maintains a constant vertical distance from the camera. The processing logic 130 assumes these constraints either by providing such constraints as/on variables in a computation or by applying computations that require these constraints to hold, as is done in the example provided herein.

In this calculation, the license plate is furthermore always considered to be below the camera 105, with respect to the road.

In order to prevent errors, the plate height module 161 imposes performs a discrimination on images and uses only images that conform to a certain standard of quality. In this example, the plate height module 161 does not estimating the plate height from the road using images where the plate is very close to the borders of the image since in these images, the plate can be cropped, as is the case in the image shown in FIG. 6, leading to wrong points in the source image. This discrimination may also take place at the feature identification module 160, which may discount images where the plates are too close (e.g. closer than a preset threshold) to the borders of the image.

This discrimination may be applied to the speed estimation and/or the calibration process as a whole in order to avoid incorrect speed estimation or camera parameter estimation. In this example, speed estimation is not performed if all images for a plate are likely to be cropped (e.g. they are all close to the image border), if not all images for the same plate give approximately the same height, or if the calculated plate height is very unlikely (e.g. below the road, or over 1.5 m from the road).

The speed estimation module 135 comprises logic for deriving the physical space position of a feature of an image on the basis of its image space position, logic for computing a travel distance over a plurality of images and logic for computing speed of travel. In particular, the speed estimation module uses an absolute-position-independent relationship between an image space placement and a physical space position relative to the camera in a speed estimation algorithm to determine the speed of vehicles captured by the camera. The absolute-position-independence means that knowledge of the precise location of the camera with respect to the physical environment, e.g. the road, is not required as image-space placements (e.g. position) are related only to physical-space positions relative to the camera.

In this particular example, the speed estimation module 135 converts image space coordinates to physical space coordinates using the tilt angle, roll angle and focal length. The speed estimation module 135 comprises logic, in this example in the form of computer-readable instructions for computing the matrix that transforms a coordinate from a coordinate system aligned with the camera itself to the physical space coordinate system as follows:

$$M = \begin{pmatrix} -1 & 0 & 0 \\ 0 & 0 & 1 \\ 0 & 1 & 1 \end{pmatrix} \begin{pmatrix} 1 & 0 & 0 \\ 0 & \cos\theta_t & \sin\theta_t \\ 0 & -\sin\theta_t & \cos\theta_t \end{pmatrix} \begin{pmatrix} \cos\theta_r & \sin\theta_r & 0 \\ -\sin\theta_r & \cos\theta_r & 0 \\ 0 & 0 & 1 \end{pmatrix}$$
$$= \begin{pmatrix} -\cos\theta_r & -\sin\theta_r & 0 \\ \sin\theta_t\sin\theta_r & -\sin\theta_t\cos\theta_r & \cos\theta_t \\ -\cos\theta_t\sin\theta_r & \cos\theta_t\cos\theta_r & \sin\theta_t \end{pmatrix}$$

The image space to physical space conversion module 162 further comprises logic to compute the function $f(X,z) = (f_x(X,Y,z), f_x(X,Y,z), z)$ that converts the position of a point $X=(X,Y)$ in image coordinate system to a point $x=(x,y,z)$ in the physical space coordinate system:

$$f_x(X, Y, z) = z \frac{M_{11}(X - c_X)p_x + M_{12}(Y - c_Y)p_y + M_{13}F}{M_{31}(X - c_X)p_x + M_{32}(Y - c_Y)p_y + M_{33}F}$$

$$f_y(X, Y, z) = z \frac{M_{21}(X - c_X)p_x + M_{22}(Y - c_Y)p_y + M_{23}F}{M_{31}(X - c_X)p_x + M_{32}(Y - c_Y)p_y + M_{33}F}$$

where
$c_X$ and $c_Y$ are the pixel coordinates of the image center
$p_x$ and $p_y$ are the physical dimensions of the camera pixels
F is the focal length
$M_{ij}$ is the i-th line, j-th column element of matrix M.

As will be appreciated further on, some of this logic described here performs functions similar to logic in the calibration logic and for example the physical space conversion module 162. Accordingly, rather than to provide new logic in the speed estimation module 135, the speed estimation module may simply make use of logic provided in the calibration logic 170, which logic may be included in the speed estimation logic as well.

The speed estimation module 135 comprises logic to derive from the physical location of the license plate in two or more images the displacement undergone between the two or more images. To that end, the speed estimation module 135 may comprise logic to compute a difference vector between each position. Based on the difference vector, the speed estimation module 135 comprises logic for determining a distance travelled. The speed estimation module 135 also comprises logic for deriving a time difference between each position, in this example by using time stamp information (e.g. subtracting the time conveyed by the timestamp associated with the later image from the time conveyed by the timestamp associated with the earlier image). By dividing the distance travelled with the time difference during travel, for which the speed estimation module 135 comprises logic, the speed estimation module 135 can derive a speed estimate for the vehicle. If multiple images are used, multiple distance vectors can be computed to derive multiple travel distances each corresponding to multiple time differences. These may be used to derive a more accurate speed estimation, for example by taking the average of individually computed speeds.

Thus the vehicle speed estimation system 100 derives estimated speeds for vehicles on the basis of the image data from the camera 105. As mentioned, camera position is used in the estimation. Advantageously, the vehicle speed estimation system 100 comprises logic for determining camera parameters on the basis of the image data. This calibration of the system can be done in some embodiments with little or no human intervention. In one embodiment, the calibration yields a relationship between the image space and the physical space that allows the derivation of a position of a feature in the physical space on the basis of the position of the feature in images in the image space.

The processing logic 130 comprises calibration logic 170 which performs system calibration. Calibration logic 170 comprises several modules of logic described herein as well as logic for applying or using these modules. In the present example, calibration logic 170 also comprises a calibration module 171 which controls the calibration process and comprises, amongst other logic calling for use of the other modules used in calibration. In one software example the calibration module 171 comprises instructions calling instances of the modules other modules used in calibration (if these modules are implemented, for example, as instantiable classes) to perform their particular task with parameters provided by the calibration module 171. The modules that are used by the calibration logic 170 are shown here as being inside the calibration logic 170. This is to indicate that they together form the logic used in calibration, however this does not necessarily mean that they must be hierarchically encapsulated by the calibration logic 170. For example, some or all modules may be implemented e.g. by software classes that are independent from, but callable by, the calibration module 171's own logic (which may itself in one example be defined by a class of its own). When these modules are used in this manner, they together form the logic that performs calibration. Note, however that some of the modules may be used for other purposes, for example the plate height module 161 is also used in speed estimation and thus also forms part of the speed estimation logic 136 which comprises the speed estimation module 135 and the plate height module 161.

Calibration logic 170 includes logic for determining camera parameters. The calibration logic 170 takes advantage of the fact that the plate has a displacement that is parallel to the road (i.e. the plate's height with respect to the road is generally constant), and that license plates comprise a dimension (e.g. the width) that is parallel to the road and that is perpendicular to the direction of motion. As with perpendicularity to the direction of travel, the dimension is considered herein to be parallel to the road if it is measurable in a vector or plane that is parallel to the road. In this particular case the left and right sides of the plate are at the same height with respect to the road and the width is measured along a line that itself is parallel to the road. The plates may be tilted frontwardly or rearwardly but their width remains perpendicular to the motion of their respective vehicles. The calibration logic 170 also takes advantage of the fact that license plates have a displacement that is perpendicular to their bottom border, that the positions of the corners of the plates can be found as described herein, and that the physical width of the plates can be known. The calibration logic 170, takes advantage of these things and applies an assumption that these facts are true. In this example the calibration logic 170 also makes the additional assumptions that some camera parameters (in this case the focal length, F) is/are known and that the camera is positioned at a height above that of the license plates in the images it captures and that it looks downwards towards the road.

However, the calibration logic 170 performs calibration without prior knowledge of the camera installation height, the camera pan angle (leftward, rightward), the camera downward tilt angle ($\theta_t$), the camera roll angle about its optical axis ($\theta_r$), the physical height of each license plate with respect to the road, the trajectory and speed of the vehicle with respect to the road, and the focal length, if it had not been measured prior to installation.

Advantageously, the vehicle speed estimation system 100 applies a geometry that is invariant to a vertical translation that is done together for the camera and the license plates, and as such, the actual physical height of the camera is not required. The physical space is defined in terms of coordinates that are centered not on the ground elsewhere but in relation to the ground or ground-based location, but rather on the camera 105, or elsewhere but in relation to the camera 105. This also resolves the problem of angled roads. Since the geometry of the physical space is not defined based on the ground itself, it is not necessary for the ground to be horizontal, i.e. not going uphill or downhill. For the same reason, thanks to the calibration model used, the actual height of each license plate with respect to the road is irrelevant and does not need to be known or estimated. Thus it is not necessary to use a special vehicle with a known plate height to calibrate the system. With the calibration model used, the trajectory and speed of the vehicle with respect to the road are also irrelevant, thus allowing the system to use any passing vehicle, rather than a controlled vehicle to calibrate the system Moreover, the vehicle speed estimation system 100 is robust to miscalculations or false assumptions with respect to the pan angle since the geometry is invariant to the camera pan angle. If the pan angle is wrongly estimated, the plates calculated trajectories may not be parallel to the road, but the estimated speed will still be correct.

The calibration logic 170 performs the calibration described herein and then makes an assumption as to the camera installation height. In this particular example, the calibration logic 170 takes the height of one, or of an average of more than one, license plates and simply assumes a reasonable height for the license plate, in this example 600 mm. The calibration logic 170 then adds the computed height of the plate with respect to the camera (an absolute value equivalent to the height of the camera with respect to the plate) to this plate height and assumes this to be the physical height of the camera with respect to the road. The calibration logic 170 may then store this value in a memory location for use, e.g., by the speed estimation module 135. Although the height of license plates and/or of the camera with respect to the road are not required for speed estimation, the camera height is optionally used to implement error checking. In one example vehicle speed estimation is not performed if the license plate height is detected as being below the road level.

The calibration logic 170 similarly makes an assumption regarding the pan angle. Specifically, the calibration logic 170 computes the displacement for one license plate, or the average displacement for more than one license plate, and sets a pan angle such that the displacement direction is parallel average displacement (average displacement is generally parallel to the road). The calibration logic 170 may then store this value in a memory location for use, e.g., by the speed estimation module 135.

Although the calibration logic 170 derives assumed values for camera height and pan angle, accurate speed estimation can be performed with only the camera downward tilt angle $\theta_t$, the camera roll angle about it optical axis, $\theta_r$, and the focal length.

In this example, the focal length is a known constant that is a characteristic of the camera used. As described herein, the calibration logic 170 determines the tilt and roll angles. The logic implied, described in full details herein, may involve assuming a hypothetical tilt and roll angle, calculating the vertical distance of at least one license plate in at least two images with respect to the camera in the manner taught herein, deriving the position in the physical space of the license plate in each image, converting the position in the physical space back to positions in the image space, computing an error between the so-computed position in the image space and the actual position of the license plate in the image space of the images used, modifying the hypothetical tilt and roll angle on the basis of the error and repeating the process until no more reduction of the error is possible. The assumed hypothetical tilt and roll angles are then considered to be the camera 105's actual tilt and roll angles and the calibration logic 170 may then store these value in a memory location for use, e.g., by the speed estimation module 135.

To this end, the calibration logic 170 employs the image feature identification module 160 as described herein to identify a particular license plate in at least two images (corresponding respectively to a first and second time) and determine the license plate placement at each of the first and second times. In this particular example, the calibration logic 170 first identifies in an image stream all the images in a sequence that have a same license plate and that satisfy the discrimination described herein. It then selects the first and last such image where the license plate appear. In these selected two images, the image feature identification module 160 identifies the location of a point on the left side of the license plate in the first image in the manner described herein. This point will be referred to as Point A herein. The image feature identification module 160 identifies the location of a point on the right side of the license plate in the first image in the manner described herein. This point will be referred to as Point B herein. The image feature identification module 160 identifies the location of a point on the left side of the license plate in the second image in the manner described herein. This point will be referred to as Point C herein. And finally, the image feature identification module 160 identifies the location of a point on the right side of the license plate in the second image in the manner described herein. This point will be referred to as Point D herein. FIG. 7 illustrates points A, B, C and D in one particular example.

These positions of these points with respect to the road are unknown. However, because of some of the assumptions made by the calibration module 170, these positions are not completely independent from each other. In particular, the assumptions mean that the four points have the same height, that the distance between A and B and the distance between C and D are equal to the physical width of the license plate, and that since the plate is assumed to travel perpendicularly to its long end, points A, B, D and C, when translated to the physical space, form a rectangle.

It is possible to express the positions of the points A, B, C, D using only the following 5 unknown quantities: $(x_A, y_A, z_A, x_C, y_C)$. If they become known, these quantities (along with the hypothesis listed above) would completely determine the positions of all the points. The other unknown quantities are the tilt angle and the roll angle of the camera. The focal length may also unknown if it had not been measured prior to installation.

Each license plate provides 8 equations to help determining these unknown quantities. Given physical space coordinates for points A, B, C and D, these coordinates can be converted using the roll angle, tilt angle and focal length camera parameters to the image space coordinates. If the camera parameters used are accurate, then the four points A, B, C, D so converted should be found to be in the same position as was identified by the image feature identification module 160.

In short, for a passing license plate, we have 5 n+2 (+1) unknown quantities ($x_A, y_A, z_A, x_C, y_C$ of each plate, tilt and roll, possibly focal length) and 8 n equations (4 points, x and y). Thus only a single plate is necessary to have enough equations to determine all the quantities. However, more may be used in order reduce the impact of an error in the computations related to a particular plate. The algorithm described herein minimizes a sum of errors. More plates/images may be used by minimizing the errors over all the image positions of all the plates. To this end, the calibration logic 170 may operate on a number of plates, e.g. 20. It waits until all the plates have passed, then taking all the position data of the plates in all the images it has selected it performs the calibration by minimizing the error as taught herein iteratively until no more error reduction can be found. For the purpose of clarity of description, the process is described for a single plate taken at two positions (in two images).

Camera parameters are estimated by the calibration logic 170 as described herein. Herein, bold indicates a vector notation where a lower case x=(x,y,z) denotes physical space coordinates and upper case X=(X,Y) denotes image space coordinates.

If multiple plates are used in the calibration process, the feature identification module 160 identifies the image space positions of left and right points of the plates in the first and in the last images where each plate i (i=1 . . . n) appears. These points are expressed in pixel coordinates in the images, where the axis origin is centered on the top left pixel, with the X axis going rightward and the Y axis going downward in the image. Thus, we derive for each plate:

$X_{iA}=(X_{iA}, Y_{iA})$ the coordinates of the left point in the first image of the plate i $X_{iB}=(X_{iB}, Y_{iB})$ the coordinates of the right point in the first image of the plate i $X_{iC}=(X_{iC}, Y_{iC})$ the coordinates of the left point in the last image of the plate i $X_{iD}=(X_{iD}, Y_{iD})$ the coordinates of the right point in the last image of the plate i The calibration logic then identifies the plate width $w_i$ (expressed here in millimeters) of each of the plate i. In this particular example, the vehicle speed estimation system 100 is configured for use in North America in jurisdictions where $w_i$ is constant and its value is 300 mm. Therefore this value is a pre-set constant, e.g. stored as a constant variable. However, in alternate embodiments, the calibration logic 170 may comprise logic for identifying the plate width on the basis of detected plate features such as a detected country code and/or plate number, e.g. by looking these plate features up in a database of plate widths.

For the purposes of the present description of this example, the physical space coordinates are defined as shown in FIG. 4, as having an origin centered on the camera 105's focal point, with the x and y axis parallel to the road plane, the z axis pointing downward and the x and y axis oriented such than the camera has a pan angle of 0. This coordinate system is preferred for simplicity of the computations required herein, however, other coordinate systems defined about, or in relation to, the camera 105 may be used, although this requires adaptation of the computations to the other coordinate system. FIG. 4 shows a perspective view of the physical state coordinate system axes, while FIG. 8 shows the same in a top view.

As mentioned herein, in this example the focal length F is a known constant that is a camera characteristic. However, if the focal length F is not known, the calibration sets it to an arbitrarily large value. The calibration logic 170 may store this value in a memory location, in this case as a variable.

The calibration logic also sets arbitrary, but plausible, values for camera tilt angle $\theta_t$ (downward toward the road) and roll angle $\theta_r$ (around its optical axis). The calibration logic 170 may store this value in a memory location, in this case as a variable. These initial values may in fact be pre-set.

The calibration logic 170 comprises logic for deriving the physical space position of a feature of an image on the basis of its image space position. In particular, image space position to physical space position conversion logic is provided in the image space to physical space conversion module 162 which converts image space coordinates to physical space coordinates using the tilt angle, roll angle and focal length. The image space to physical space conversion module 162 comprises logic, in this example in the form of computer-readable instructions for computing the matrix that transforms a coordinate from a coordinate system aligned with the camera itself to the physical space coordinate system as follows:

$$M = \begin{pmatrix} -1 & 0 & 0 \\ 0 & 0 & 1 \\ 0 & 1 & 1 \end{pmatrix} \begin{pmatrix} 1 & 0 & 0 \\ 0 & \cos\theta_t & \sin\theta_t \\ 0 & -\sin\theta_t & \cos\theta_t \end{pmatrix} \begin{pmatrix} \cos\theta_r & \sin\theta_r & 0 \\ -\sin\theta_r & \cos\theta_r & 0 \\ 0 & 0 & 1 \end{pmatrix}$$

-continued $$= \begin{pmatrix} -\cos\theta_r & -\sin\theta_r & 0 \\ \sin\theta_t\sin\theta_r & -\sin\theta_t\cos\theta_r & \cos\theta_t \\ -\cos\theta_t\sin\theta_r & \cos\theta_t\cos\theta_r & \sin\theta_t \end{pmatrix}$$

The image space to physical space conversion module 162 further comprises logic to compute the function $f(X,z)=(f_x(X,Y,z), f_y(X,Y,z),z)$ that converts the position of a point $X=(X,Y)$ in image coordinate system to a point $x=(x,y,z)$ in the physical space coordinate system:

$$f_x(X, Y, z) = z\frac{M_{11}(X-c_X)p_x + M_{12}(Y-c_Y)p_y + M_{13}F}{M_{31}(X-c_X)p_x + M_{32}(Y-c_Y)p_y + M_{33}F}$$

$$f_y(X, Y, z) = z\frac{M_{21}(X-c_X)p_x + M_{22}(Y-c_Y)p_y + M_{23}F}{M_{31}(X-c_X)p_x + M_{32}(Y-c_Y)p_y + M_{33}F}$$

where
$c_X$ and $c_Y$ are the pixel coordinates of the image center
$p_x$ and $p_y$ are the physical dimensions of the camera pixels
F is the focal length
$M_{ij}$ is the i-th line, j-th column element of matrix M.

The calibration logic 170 also comprises logic for deriving the image space position of a feature of an image on the basis of its physical space position. In particular, physical space position to image space position conversion logic is provided in the physical space to image space conversion module 164 which converts image space coordinates to physical space coordinates using the tilt angle, roll angle and focal length. To this end the physical space to image space conversion module 164 comprises logic that computes the function $f^{-1}(x)=(f_X^{-1}(x,y,z), f_Y^{-1}(x,y,z))$ that converts the position of a point $x=(x,y,z)$ in the physical space coordinate system to a point $X=(X,Y)$ in image coordinate system:

$$f_X^{-1}(x, y, z) = \frac{F}{p_x}\frac{M_{11}^{-1}x + M_{12}^{-1}y + M_{13}^{-1}z}{M_{31}^{-1}x + M_{32}^{-1}y + M_{33}^{-1}z} + c_X$$

$$f_Y^{-1}(x, y, z) = \frac{F}{p_y}\frac{M_{21}^{-1}x + M_{22}^{-1}y + M_{23}^{-1}z}{M_{31}^{-1}x + M_{32}^{-1}y + M_{33}^{-1}z} + c_Y$$

where
$M_{ij}^{-1}$ is the i-th line, j-th column element of matrix $M^{-1}$ that is the inverse of matrix M.

The calibration logic 170 comprises logic executable on the controller 110 to cause the controller 110 to assume an assumed set of camera parameters. The set of camera parameters may include a value of Focal length F, camera tilt angle $\theta_t$ and roll angle $\theta_r$, however in this example the assumed set of camera parameters include only camera tilt angle $\theta_t$ and roll angle $\theta_r$.

In a calibration process, after having derived the image space location of the four points A, B, C, and D of at least one license plate at the image feature identification module 160, the rough location of each of the license plate in the physical space coordinate system is computed by the image space to physical space conversion module 162 using the current values of the tilt angle, roll angle and focal length, which in a first iteration are the preset values or values set by the calibration logic 170 described above (arbitrary, but plausible, values for camera tilt angle $\theta_t$ and roll angle $\theta_r$ and the focal length of the camera or an arbitrary large value) and enforcing the license plate width from the first image. This assumed set of camera parameters is a first set of camera parameters from a plurality of sets of camera parameters. The calibration logic 170 then causes the controller 110 to define a tentative absolute-position-independent relationship between image-space placement and physical-space position on the basis of the assumed set of camera parameters.

To this end, the calibration module 170 begins by setting the license plate z coordinate to be at a test value $z_{test}$ (for example $z_{test}=1000$ mm), which it may store in memory although which in a first instance may be a preset value. Using this value, the calibration module 170 causes the image space to physical space conversion module 162 to compute the positions of the license points A (left point in first image) and B (right point in first image) in the physical space if these points were at $z_{test}$:

$$x_{test\ iA} = f(X_{iA}, z_{test})$$

$$x_{test\ iB} = f(X_{iB}, z_{test})$$

The calibration module 170 also comprises positional information computation logic provided here in positional information computation module 163. The positional information computation module 163 comprises logic to perform geometric computation to compute positional information and dimensions in three dimensions on the basis of physical space positional information and more specifically in this case on the basis of physical space coordinates.

After having computed the position of license points A and B as described immediately above, the calibration module 170 causes the positional information computation module 163 to compute the width of each license plate if the plates were at $z_{test}$:

$$w_{test\ i} = \|x_{test\ iB} - x_{test\ iA}\|$$

That being done, the positional information computation module 163 then computes the z coordinate of each license plate such that the license plates have the proper width:

$$z_i = w_i / w_{test\ i}$$

That being done, the calibration module 170 then causes the image space to physical space conversion module 162 to compute the physical space positions of the license points A (left point in first image) and C (left point in last image) according to this z coordinate:

$$x_{iA} = f(X_{iA}, z_i)$$

$$x_{iC} = f(X_{iC}, z_i)$$

Thus the tentative absolute-position-independent relationship is used to compute a physical space location (which in this case is a relative physical space location, relative to the camera) of at least a portion of the vehicle (in particular at least a portion of the vehicle feature, in this case points A and C). This is done at each of the first and second times (e.g. point A at the first time and point C at the second time). This will be used in evaluating the validity of the tentative absolute-position-independent relationship, and in particular in verifying compliance with the set of physical constraints, that is to say with at least one of the physical constraints assumed.

The calibration module 170 then causes positional information computation module 163 to complete the computation of positions of the 4 points of the license plates by enforcing that the plate has the proper width and that its motion is perpendicular to its top and bottom sides. To this end, the positional information computation module 163 comprises logic for computing a displacement vector which it applies to compute the displacement vector:

$d_i = x_{iC} - x_{iA}$

The positional information computation module 163 comprises logic for computing the vector parallel to the plate top and bottom sides with the length equal to the width of the license plate which it applies:

$e_i = w_i(0,0,1) \times (d_i / \|d_i\|)$

The positional information computation module 163 may if necessary, negate this vector such that its x component is always negative.

Thus we now have the vector that defines the spatial relationship between the opposite sides of the license plate if points A, B, C and D form a rectangle as they should. The positional information computation module 163 also comprises logic to compute the physical space positions of the points B (right point in first image) and D (right point in last image) based on this vector and applies it:

$x_{iB} = x_{iA} + e_i$ $x_{iD} = x_{iC} + e_i$

Now the calibration module 170, once this is done, causes the physical space to image space conversion module 164 to compute the predicted positions of these 4 points in the image coordinate system:

$X'_{iA} = f^{-1}(x_{iA})$ $X'_{iB} = f^{-1}(x_{iB})$ $X'_{iC} = f^{-1}(x_{iC})$ $X'_{iD} = f^{-1}(x_{iD})$

The calibration logic 170 also comprises an error computation module 165 which comprises logic for computing an error between different positions in a given space. The calibration logic 170 comprises logic executable at the controller 110 for causing the controller 110 to evaluate the validity of the tentative absolute-position independent relationship. If the validity is established, this tentative absolute-position relationship may be established as the selected one with which to perform speed estimation. In this example, since the assumptions are applied and image space positions are computed based on the assumptions, the error computation module 165 comprises logic for computing errors between different positions in the image space, and more particularly here for computing the pixel errors between the measured pixel positions and the predicted pixel positions for all the points of all the license plates. After the predicted positions of the four points have been computed as described, the calibration logic causes the error computation module 165 to compute the pixel errors between the measured pixel positions and the predicted pixel positions for all the points of all the license plates:

$E_{iA} = (E_{X\,iA}, E_{Y\,iA}) = X'_{iA} - X_{iA}$ $E_{iB} = (E_{X\,iB}, E_{Y\,iB}) = X'_{iB} - X_{iB}$ $E_{iC} = (E_{X\,iC}, E_{Y\,iC}) = X'_{iC} - X_{iC}$ $E_{iD} = (E_{X\,iD}, E_{Y\,iD}) = X'_{iD} - X_{iD}$

The error computation module 165's logic also computes the total squared pixel error:

$E^2 = \Sigma_{i=1}^{n} (\|E_{iA}\|^2 + \|E_{iB}\|^2 + \|E_{iC}\|^2 + \|E_{iD}\|^2)$ We thus have an error value that is caused by inaccuracies in the assumptions made, and more specifically by inaccuracies in the selected values of camera parameters, namely the tilt angle, roll angle and focal length (if it wasn't known).

This having been established, the calibration module 170 may store in a memory an indication of the error value obtained for the particular values of camera parameters used. The calibration module 170's logic implements an iterative approach whereby different parameters sought by the calibration process, in this case the camera parameters, and more specifically in this case the tilt angle $\theta_t$ and the roll angle $\theta_r$ are tested to see their impact on the computed error the assumption of these parameters yields. If the evaluation of the tentative absolute-position-independent relationship indicates that the tentative relationship is valid, it may be established as the selected relationship with which to perform speed estimation. In practice, it may be required to try several sets of camera parameters before validity can be established. Thus the steps of assuming an assumed set of camera parameters, defining a tentative absolute-position-independent relationship between and image space placement and a physical space position relative to the camera, evaluating the validity of using the tentative relationship to compute a physical space location of the vehicle feature and verifying compliance with the assumed physical constraints may be repeated several times. In particular, it may be repeated until a set of camera parameters that provides the lowest error is found, the resulting relationship being selected.

More specifically, the calibration module 170 comprises logic to now set a new value for the tilt angle $\theta_t$ and the roll angle $\theta_r$, as well as the focal length F if it isn't known, and cause the repetition of the steps described above subsequent to the setting of $\theta_t$ and $\theta_r$ (and optionally F) to derive a new error value corresponding to these new camera parameters. This is then repeated, under the calibration logic 170's logic, for all plausible values, using small increments (for example: $\theta_t$ varying from 0° to 70° with 1° steps and $\theta_r$ varying from −20° to 20° with 1° steps, and (if F is unknown) varying F from 8 mm to 60 mm in 1 mm steps), each time storing the error associated with the camera parameters used.

Comparison logic, shown here as its comparator module 166 but which may be implemented directly in the calibration module 170's logic, compares the different errors found to identify the values of $\theta_t$ and $\theta_r$ (and F, if unknown) that yield the smallest total squared pixel error E and take note of the physical space coordinates $x_{iA}$ and $x_{iC}$ of the points A and C for all license plates when computed at these values of $\theta_t$, $\theta_r$ and F. (To this end the values of $x_{iA}$ and $x_{iC}$ may be stored, e.g. by the calibration logic 170, alongside the errors E or the values of $x_{iA}$ and $x_{iC}$ can be recomputed. While the comparison logic may be implemented after all errors have been computed, other implementations are possible, such as a case-by-case comparison (upon computation of each error) of each error with the smallest error, with the computed error replacing the smallest error if it is smaller.

We now have estimated values of the camera parameters $\theta_t$, $\theta_r$ and F. This estimate can be further refined using an optimization process that is more uniform in its treatment of the 4 points of each license plate.

To this end, the calibration module 170 comprises refinement logic, in this example provided in refinement module 167 that applies an optimization to the estimation of the camera parameters to derive more accurate camera parameters. The refinement module 167's logic also computes the focal length if it was not known.

The calibration module 170 forms a parameter vector with the following variables which is provided to the refinement module 167 to optimize. The vector is initialized with the following parameters:

- $\theta_t$ (which is the tilt angle found by the process described above)
- $\theta_r$ (which is the roll angle found by the process described above)
- F
- $x_{iA}$
- $y_{iA}$
- $x_{iC}$
- $y_{iC}$
- $z_i$ The last 5 variables to optimize exist for each license plate, so the total parameter vector length is 5n+3.

A function is defined that computes X and Y pixel errors for each of the 4 points of each of the license plate according to the values of the parameter vector to optimize. In this example, this function employs the physical space to image space conversion module 164 to convert the physical space parameters to image space parameters as described above and employs the positional information computation module 163 to compute the physical space position of the points B (right point in first image) and D (right point in last image) based on the values of $x_{iA}$ and $x_{iC}$ provided in the parameter vector:

$$x_{iB} = x_{iA} + e_i$$

$$x_{iD} = x_{iC} + e_i$$

Now the refinement module 167's logic, once this is done, causes the physical space to image space conversion module 164 to compute the predicted positions of these 4 points in the image coordinate system:

$$X'_{iA} = f^{-1}(x_{iA})$$

$$X'_{iB} = f^{-1}(x_{iB})$$

$$X'_{iC} = f^{-1}(x_{iC})$$

$$X'_{iD} = f^{-1}(x_{iD})$$

The refinement module 167's logic then causes the error computation module 165 to compute the pixel errors between the measured pixel positions and the predicted pixel positions for all the points of all the license plates:

$$E_{iA} = (E_{X\,iA}, E_{Y\,iA}) = X'_{iA} - X_{iA}$$

$$E_{iB} = (E_{X\,iB}, E_{Y\,iB}) = X'_{iB} - X_{iB}$$

$$E_{iC} = (E_{X\,iC}, E_{Y\,iC}) = X'_{iC} - X_{iC}$$

$$E_{iD} = (E_{X\,iD}, E_{Y\,iD}) = X'_{iD} - X_{iD}$$

The refinement module 167 also comprises logic for applying the Levenberg-Marquardt algorithm, and applies it to jointly find the optimal values of the parameter vector such that the total squared error is minimized.

At the end of the optimization process, the resulting values of $\theta_t$ and $\theta_r$ form the final estimate of the tilt and roll angles of the camera 105. If desired logic may be provided to do a transformation of the physical coordinate system, for example such that the origin is at a different position, e.g. underneath the camera at the road level with its y axis direction parallel to the direction of the road. For this, optional logic may be provided to the calibration module 170 to compute the camera installation height as $$h = \frac{1}{n}\sum_{i=1}^{n} z_i - 600 \text{ mm}$$

where 600 mm is an arbitrary plausible average height of the license plates with respect to the road and to compute the total displacement vector of all the plates:

$$d = \sum_{i=1}^{n} d_i$$

(in this summation, some of the $d_i$ may be negated such that they all have the same sign on their y component) and transform it to a camera pan angle $\theta_p$ such that the average displacement is aligned with the physical space y axis:

$$\theta_p = \tan^{-1}(d_x/d_y)$$

The camera parameters, as derived by the calibration process applied by the processing logic 130 as described herein, are given by the computed quantities

- $\theta_t$ (tilt angle)
- $\theta_r$ (roll angle)
- $\theta_p$ (pan angle)
- h (camera installation height)
- F (focal length), if it had not been measured prior to camera installation For simplicity, modules of the calibration logic 170, e.g. the positional information computation module 163, are shown here as single modules, but it will be appreciated that the implementation of these modules may vary. For example in a software implementation some or all of the logic of the positional information computation module 163 may be distributed in different modules (e.g. instantiable classes) for performing different geometric computations and/or some or all of its logic may be implemented simply as software code of the calibration module. Thus in some implementations some or all of the computations shown here may be implemented by lines of code directly where they are used, rather than in a separate module (e.g. software class) called upon by a parent process. This is of course also true of the other modules, although for many reasons (e.g. programming efficiency for software embodiments, and chip real-estate conservation in hardware embodiments) isolation of the more complicated repeated functions into modules may be considered preferable in many implementations.

Although various embodiments have been illustrated, this was for the purpose of describing, but not limiting, the present invention. Various possible modifications and different configurations will become apparent to those skilled in the art and are within the scope of the present invention, which is defined more particularly by the attached claims.

The invention claimed is:

1. A method for calibrating a vehicle speed estimation system that employs a camera having a set of camera parameters to estimate the speed of vehicles based on images received from the camera, the images defined in an image space and the vehicles and camera each belonging to a physical space and having an absolute position therein, the method comprising:

a) receiving at a controller from the camera a calibration image stream comprising a first image of a vehicle captured at a first time and a second image of the vehicle captured at a second time, the first and second images having the same image space;

b) at a controller executing controller logic to identify in each of the first and second image a vehicle feature having a known dimension in the physical space, the identifying comprising determining a placement of the vehicle feature in the image space at each of the first and second times;

c) at the controller executing controller logic to define on the basis of the placement of the vehicle feature in the image space at each of the first and second times an absolute-position-independent relationship between an image space placement and a physical space position relative to the camera;

d) at the controller, using controller logic, applying the absolute-position-independent relationship between an image space placement and a physical space position relative to the camera in a speed estimation algorithm to determine the speed of a vehicle captured by the camera.

2. The method of claim 1, wherein executing controller logic to define on the basis of the placement of the vehicle feature in the image space at each of the first and second times an absolute-position-independent relationship between an image space placement and a physical space position relative to the camera comprises: assuming a set of physical constraints concerning the vehicle feature whereby the absolute-position-independent relationship between an image space placement and a physical space position relative to the camera is further defined on the basis of the set of physical constrains.

3. The method of claim 2, wherein the set of physical constraints comprises at least one of:
   a) a known dimension of the feature;
   b) that the vehicle feature is perpendicular to a direction of travel of the vehicle; and
   c) that the vehicle feature maintains a constant vertical distance from the camera.

4. The method of claim 2, wherein the absolute-position-independent relationship between an image space placement and a physical space position relative to the camera is a selected absolute-position-independent relationship, and wherein the executing controller logic to define the selected absolute-position-independent relationship comprises:
   a) assuming an assumed set of camera parameters;
   b) defining a tentative absolute-position-independent relationship between an image space placement and a physical space position relative to the camera on the basis of the assumed set of camera parameters;
   c) evaluating the validity of the tentative absolute-position-independent relationship and upon confirming the validity establishing the tentative absolute-position-independent relationship as the selected absolute-position-independent relationship.

5. The method of claim 4, wherein evaluating the validity of the tentative absolute-position-independent relationship comprises
   d. using the tentative absolute-position-independent relationship computing a physical space location of at least a portion of the vehicle at each of the first and second times;
   e. verifying compliance with the assumed set of physical constraints of the computed space location of the at least a portion of the vehicle at each of the first and second times.

6. The method of claim 5, wherein:
   a) the set of camera parameters is a first set of camera parameters from among a plurality of sets of camera parameters, further comprising repeating steps a-e with each of the plurality of different sets of camera parameters;
   b) verifying compliance with the set of physical constraints comprises using the tentative absolute-position-independent relationship and the set of physical constraints to compute a tentative image space placement for the vehicle feature and computing an error between the tentative image space placement for the vehicle feature and the placement of the vehicle feature in the image space at at least one of the first and second times; and
   c) verifying compliance with the set of physical constraints comprises selecting a selected set of camera parameters from among the plurality of sets of camera parameters providing the lowest error.

7. The method of claim 4, wherein the assumed set of camera parameters comprises at least one of a) a tilt angle ($\theta_t$); and b) a roll angle ($\theta_r$).

8. The method of claim 4, wherein the assumed set of camera parameters comprises tilt angle ($\theta_t$) and a roll angle ($\theta_r$), and wherein the absolute-position-independent relationship between an image space placement and a physical space position relative to the camera is a function of the matrix M where:

$$M = \begin{pmatrix} -\cos\theta_r & -\sin\theta_r & 0 \\ \sin\theta_t\sin\theta_r & -\sin\theta_t\cos\theta_r & \cos\theta_t \\ -\cos\theta_t\sin\theta_r & \cos\theta_t\cos\theta_r & \sin\theta_t \end{pmatrix}.$$

9. The method of claim 8, wherein the absolute-position-independent relationship between an image space placement and a physical space position relative to the camera comprises the function $f_y(X,Y,z)$ for converting from image-space coordinates to physical-space coordinates where:

$$f_y(X,Y,z) = z\frac{M_{21}(X-c_X)p_x + M_{22}(Y-c_Y)p_y + M_{23}F}{M_{31}(X-c_X)p_x + M_{32}(Y-c_Y)p_y + M_{33}F}.$$

10. The method of claim 8, wherein the absolute-position-independent relationship between an image space placement and a physical space position relative to the camera comprises the functions $f_X^{-1}(x,y,z)$ and $f_X^{-1}(x,y,z)$ for converting from physical-space coordinates to image-space coordinates where:

$$f_X^{-1}(x,y,z) = \frac{F}{p_x}\frac{M_{11}^{-1}x + M_{12}^{-1}y + M_{13}^{-1}z}{M_{31}^{-1}x + M_{32}^{-1}y + M_{33}^{-1}z} + c_X$$

$$f_Y^{-1}(x,y,z) = \frac{F}{p_y}\frac{M_{21}^{-1}x + M_{22}^{-1}y + M_{23}^{-1}z}{M_{31}^{-1}x + M_{32}^{-1}y + M_{33}^{-1}z} + c_Y.$$

11. A camera-based visual speed estimation system for estimating the speed of vehicles on the basis of video output from of a camera, the camera-based visual speed estimation system comprising:

a) a controller camera input for receiving from the video output of the camera comprising at least first and second images of a travelling vehicle captured at respective first and second times, the first and second images being defined in an image space and the travelling vehicle and camera each belonging to a physical space and having respective absolute positions therein;

b) a tangible controller in communication with the camera input and receiving therefrom the video data from the camera comprising at least the first and second images, the controller comprising calibration logic executable on the controller for causing the controller to:
  i. identify in each of the first and second image a vehicle feature having a known dimension in the physical space, the identifying comprising determining a placement of the vehicle feature in the image space at each of the first and second times;
  ii. define on the basis of the placement of the vehicle feature in the image space at each of the first and second times an absolute-position-independent relationship between an image space placement and a physical space position relative to the camera;
  iii. apply the absolute-position-independent relationship between an image space placement and a physical space position relative to the camera in a speed estimation algorithm to derive speed estimation data indicative of the speed of a vehicle captured by the camera;

c) a controller output in communication with the controller for receiving from the controller the speed estimation data and outputting the speed estimation data.

12. The camera-based visual speed estimation system of claim 11, wherein the calibration logic executable on the controller for causing the controller to define on the basis of the placement of the vehicle feature in the image space at each of the first and second times an absolute-position-independent relationship between an image space placement and a physical space position relative to the camera comprises: logic for causing the controller to assume a set of physical constraints concerning the vehicle feature whereby the absolute-position-independent relationship between an image space placement and a physical space position relative to the camera is further defined on the basis of the set of physical constrains.

13. The camera-based visual speed estimation system of claim 12, wherein the set of physical constraints comprises at least one of:
  a) a known dimension of the feature;
  b) that the vehicle feature is perpendicular to a direction of travel of the vehicle; and
  c) that the vehicle feature maintains a constant vertical distance from the camera according to the physical space.

14. The camera-based visual speed estimation system of claim 12, wherein the absolute-position-independent relationship between an image space placement and a physical space position relative to the camera is a selected absolute-position-independent relationship, and wherein the calibration logic executable on the controller for causing the controller to define the selected absolute-position-independent relationship comprises logic executable on the controller for causing the controller to:
  a) assume an assumed set of camera parameters;
  b) define a tentative absolute-position-independent relationship between an image space placement and a physical space position relative to the camera on the basis of the assumed set of camera parameters;
  c) evaluate the validity of the tentative absolute-position-independent relationship and upon confirming the validity establishing the tentative absolute-position-independent relationship as the selected absolute-position-independent relationship.

15. The camera-based visual speed estimation system of claim 14, wherein the logic executable on the controller for causing the controller to evaluate the validity of the tentative absolute-position-independent relationship comprises logic executable on the controller for causing the controller to:
  f. using the tentative absolute-position-independent relationship compute a physical space location of at least a portion of the vehicle at each of the first and second times;
  g. verify compliance with the assumed set of physical constraints of the computed space location of the at least a portion of the vehicle at each of the first and second times.

16. The camera-based visual speed estimation system of claim 15, wherein:
  a) the set of camera parameters is a first set of camera parameters from among a plurality of sets of camera parameters, wherein the calibration logic further comprises logic executable on the controller for causing the controller to repeat steps a-e with each of the plurality of different sets of camera parameters;
  b) the logic executable on the controller for causing the controller to verify compliance with the set of physical constraints comprises logic executable on the controller for causing the controller to using the tentative absolute-position-independent relationship and the set of physical constraints to compute a tentative image space placement for the vehicle feature and to compute an error between the tentative image space placement for the vehicle feature and the placement of the vehicle feature in the image space at at least one of the first and second times; and
  c) the logic executable on the controller for causing the controller to verify compliance with the set of physical constraints comprises logic executable on the controller for causing the controller to select a selected set of camera parameters from among the plurality of sets of camera parameters providing the lowest error.

17. The camera-based visual speed estimation system of claim 14, wherein the assumed set of camera parameters comprises at least one of a) a tilt angle ($\theta_t$); and b) a roll angle ($\theta_r$).

18. The camera-based visual speed estimation system of claim 14, wherein the assumed set of camera parameters comprises a tilt angle ($\theta_t$) and a roll angle ($\theta_r$), and wherein the absolute-position-independent relationship between an image space placement and a physical space position relative to the camera is a function of the matrix M where:

$$M = \begin{pmatrix} -\cos\theta_r & -\sin\theta_r & 0 \\ \sin\theta_t\sin\theta_r & -\sin\theta_t\cos\theta_r & \cos\theta_t \\ -\cos\theta_t\sin\theta_r & \cos\theta_t\cos\theta_r & \sin\theta_t \end{pmatrix}.$$

19. The camera-based visual speed estimation system of claim 18, wherein the absolute-position-independent relationship between an image space placement and a physical space position relative to the camera comprises the function $f_y(X,Y,z)$ for converting from image-space coordinates to physical-space coordinates where:

$$f_y(X,Y,z) = z\frac{M_{21}(X-c_X)p_x + M_{22}(Y-c_Y)p_y + M_{23}F}{M_{31}(X-c_X)p_x + M_{32}(Y-c_Y)p_y + M_{33}F}.$$

20. The camera-based visual speed estimation system of claim 18, wherein the absolute-position-independent relationship between an image space placement and a physical space position relative to the camera comprises the functions $f_X^{-1}(x,y,z)$ and $f_X^{-1}(x,y,z)$ for converting from physical-space coordinates to image-space coordinates where:

$$f_X^{-1}(x,y,z) = \frac{F}{p_x}\frac{M_{11}^{-1}x + M_{12}^{-1}y + M_{13}^{-1}z}{M_{31}^{-1}x + M_{32}^{-1}y + M_{33}^{-1}z} + c_X$$

$$f_Y^{-1}(x,y,z) = \frac{F}{p_y}\frac{M_{21}^{-1}x + M_{22}^{-1}y + M_{23}^{-1}z}{M_{31}^{-1}x + M_{32}^{-1}y + M_{33}^{-1}z} + c_Y.$$

* * * * *